Aug. 7, 1928.

J. BENZION

PIPE COUPLING

Filed Sept. 18, 1926

Inventor:
Joseph Benzion,
By his Attorney, Geo. Wm Hiatt

Patented Aug. 7, 1928.

1,680,080

UNITED STATES PATENT OFFICE.

JOSEPH BENZION, OF NEW YORK, N. Y.

PIPE COUPLING.

Application filed September 18, 1926. Serial No. 136,219.

While applicable to pipe couplings and connections generally (and by the term "pipe" as herein used I mean to include flexible piping, or hose, so called) my improvements are designed primarily to afford simple but effective copulative means for use in emergencies, as in case of leakage or damage incidental to installed fluid conduits,—the object being to attain a device that may be manipulated and applied without the aid of skilled labor, or the use of solder or equivalent sealing medium, but which will insure a substantial gas or water tight joint by contactual engagement of opposed surfaces; the invention consisting substantially in the specific construction, combination and arrangement of component parts described and claimed, and a distinctive feature being the provision and use of a conoidal-ended splice-core-duct in conjunction with screw threads, nuts, and clamping sleeves, whereby the conoidal ends of said splice-core-duct may be effectually sealed against and as related to the opposed concaved ends of the piping, all as hereinafter fully set forth.

In the accompanying drawings I illustrate a practical embodiment of the essential features of my invention in a coupling device of the character designated, although I do not limit myself to the identical form and construction of parts shown by way of exemplification, since changes may be made in minor details, and equivalent mechanical expedients resorted to with like results, and without departing from the spirit and intent of my invention in this respect.

With this understanding:—

Figure 1:
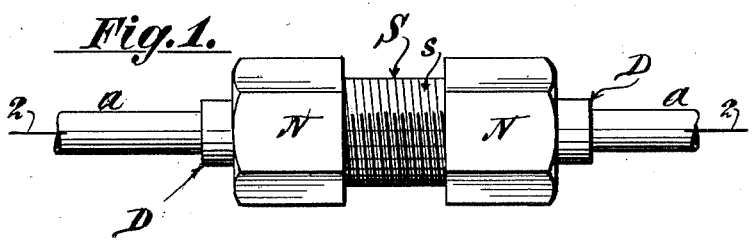
Fig. 1, is a side elevation of my pipe coupling as applied to adjacent ends of a pipe connection.
Figure 2:
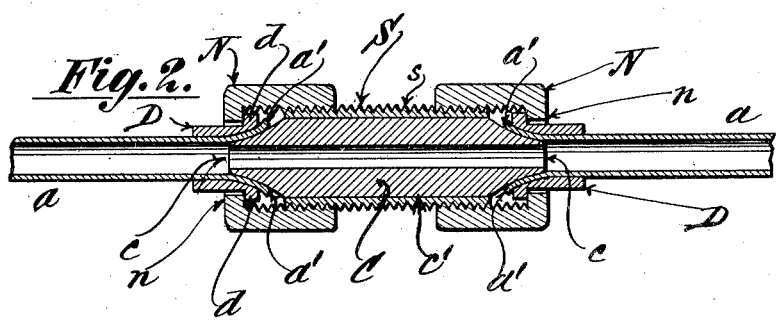
Fig. 2, is a central longitudinal section taken upon plane of line 2—2, Fig. 1.
Figure 3:
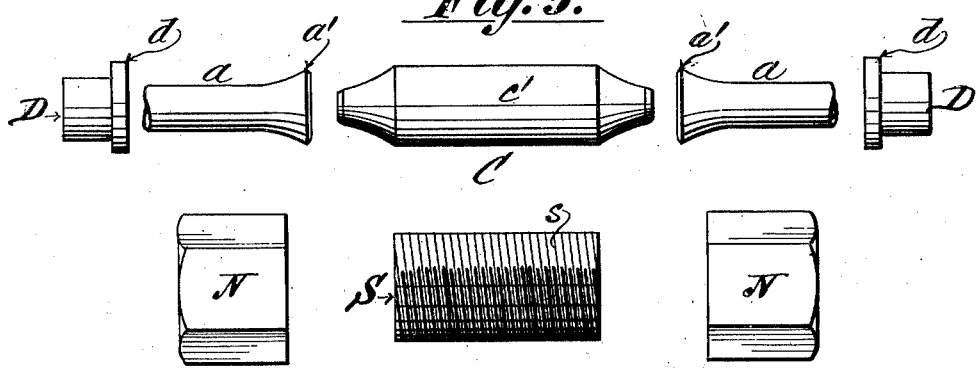
Fig. 3, is a view of the several parts shown in Fig. 1, separated.
Figure 4:
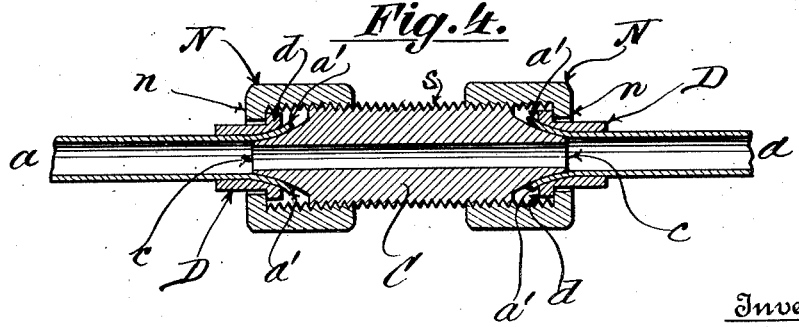
Fig. 4, is a view similar to Fig. 2, showing a modification.

$a, a$, represent the opposed ends of sections of piping to be operatively connected by my coupling device, said piping $a, a$, being made of any ductile metal, as tin, copper, etc., or of other flexible material, as in the case of rubber hose or the like, the pre-requisite in this respect being the adaptability of the material of which the piping or hose is composed to be flared outward at the ends to form concavo-conoidal seats $a', a'$, for the reception of and contactual engagement with the conoidal ends $c, c$, of the splice-core-duct C, as shown more particularly in Figs. 2 and 4, of the drawings.

The splice-core-duct C, preferably, although not necessarily made of metal, has a cylindrical body portion $c'$, provided either directly as in the modification shown in Fig. 4, with a screw thread $s$, or indirectly, as in the preceding figures of the drawing, with said screw thread $s$, formed on a core sleeve S, fitting over the core duct C, the object of the screw thread in either case being to afford means for engagement with the binding nuts N, N, as shown more particularly in Figs. 2 and 4, of the drawings, the flanges $n, n$, on said binding nuts N, N, contacting with shoulders $d, d$, on the clamping sleeves D, D, the inner surfaces of which are flared to conform to the flare of the conoidal end seats $a', a'$, of the piping $a, a$. Upon inspection of Fig. 2, it will be evident that the tightening of one nut has the effect of tightening both joints by drawing the sleeve S along the splice-core-duct C. Furthermore, due to the loose fit of the flanges $n, n$ over the sleeves D, D and of the nuts N, N over the shoulders or flanges $d, d$, and the engagement of the inner faces of the flanges $n, n$ with the outer faces of the flanges $d, d$ in planes perpendicular to the axis of the splice-core-duct C, the parts are permitted to adjust themselves and binding is avoided.

It will be obvious that by means of the nuts N, N, in conjunction with the screw thread $s$, and clamping sleeves D, a fluid tight contactual joint may be attained between the piping $a, a$, and the splice-core-duct C.

What I claim as my invention and desire to secure by Letters Patent, is:—

1. A pipe coupling of the character designated, including a splice-core-duct formed with conoidal extremities for contactual engagement with opposed flared ends of piping, and means for clamping said flared ends of piping against the conoidal extremities of said splice-core-duct including a connecting sleeve mounted on said splice-core-duct, clamping sleeves embracing said flared ends of the piping, and nuts threaded on said connecting sleeve at opposite ends thereof and loosely fitting around said clamping sleeves to permit adjustment thereof over the ends of the splice-core-duct while acting on said sleeves to clamp the tapered ends of said pipes against the ends of said spice-core-duct.

2. A pipe coupling of the character designated including a splice-core-duct formed with reduced extremities for contactual engagement with opposed flared ends of piping, and means for clamping said flared ends of piping against the reduced extremities of said splice-core-duct including clamping sleeves embracing said flared ends of piping, a connecting sleeve mounted on said splice-core-duct, and means at the ends of said connecting sleeve for engaging said clamping sleeves to effect their clamping movements, the means at one end of said connecting sleeve including a nut having a threaded connection with said connecting sleeve and having a loose fit around the corresponding clamping sleeve to permit adjustment thereof over the corresponding reduced extremity of the splice-core-duct.

3. A pipe coupling of the character designated including a spice-core-duct formed with a central cylindrical portion and tapered ends to enter opposed flared ends of piping, and means for clamping said flared ends of piping against the flared ends of said splice-core-duct including clamping sleeves having tapered openings to receive the flared ends of piping and having cylindrical bodies and outwardly projecting flanges at their inner ends, a connecting sleeve slidably mounted on the cylindrical portion of said splice-core-duct and having screw-threaded ends, and nuts threaded on the ends of said connecting sleeve and having at their outer ends inwardly projecting flanges to engage the outer faces of the flanges of said clamping sleeves in planes perpendicular to the axis of the splice-core-duct, the nuts fitting loosely around the flanges of the clamping sleeves and the flanges of the nuts fitting loosely around the cylindrical bodies of the clamping sleeves.

JOSEPH BENZION.